United States Patent [19]
Pitts

[11] 3,769,739
[45] Nov. 6, 1973

[54] FISHING LURE

[76] Inventor: John O. Pitts, 268 W. Parkview, Grand Junction, Colo. 81501

[22] Filed: Aug. 21, 1972

[21] Appl. No.: 282,116

[52] U.S. Cl.............. 43/42.35, 43/42.06, 43/42.32, 43/42.48
[51] Int. Cl............................................ A01k 85/00
[58] Field of Search........................ 43/42.06, 42.22, 43/42.32, 42.35, 42.47, 42.48

[56] References Cited
UNITED STATES PATENTS

| | | | |
|---|---|---|---|
| 1,133,669 | 3/1915 | Reynolds | 43/42.47 |
| 2,476,388 | 7/1949 | Schafer | 43/42.06 |
| 2,505,922 | 5/1950 | Stranak | 43/42.48 |
| 2,515,103 | 7/1950 | Townsend | 43/42.47 |
| 2,536,553 | 1/1951 | La Fleur | 43/42.48 |
| 2,567,728 | 9/1951 | Rivero | 43/42.47 |

*Primary Examiner*—F. Barry Shay
*Attorney*—Kay S. Cornaby

[57] ABSTRACT

An improved fishing lure adapted to gyrate in a manner attractive to fish when moved through the water has a cylindrical body which may be hollow for holding fish scent. One end of the body is pressed or molded together to form a planar surfaced section for attaching the leader and line thereto. The leader section is disposed at an obtuse angle of from about 135° to 175° with respect to the body member. An elongate tail section is disposed at the opposite end of the cylindrical body and has an open upper surface and a generally concave cross section with flared sides. These flared sides have increasing lateral dimension from the point of attachment at the cylindrical body to the opposite end of the tail section. The open upper surface of the tail section can be disposed in a rotated position about the longitudinal axis of the body, such that the angle of rotation measures from about 5° to about 32° maximum.

5 Claims, 6 Drawing Figures

PATENTED NOV 6 1973 3,769,739

FISHING LURE

BACKGROUND OF THE INVENTION

1. Field

This invention relates to fishing lures.

2. State of the Art

A fishing lure has as its primary objective to resemble the motions of natural or live bait on which fish rely for their food. The more successfully a fishng lure can imitate a particular natural bait, and thereby deceive the fish, the more successful and desirable such a fishing lure is. A wide variety of fishing lures are presently available on the commercial market. Many of the lures are adapted to resemble a specific fish bait and are designed to attract a certain type of fish feeding on such a bait. Other types of lures are intended only to be attractive to fish in general, without any specific motion or gyrations in the water resembling certain types of bait. While many different color combinations and combinations of construction materials are found in the fishing lure art, it is recognized that the essential elements of a lure comprise the construction features which provide unique motions in the water resembling natural or live bait sources. It is also recognized that construction differences which may appear small or insignificant to the untrained eye may result in greatly differing motions, which in turn can more closely resemble the actions of natural bait.

3. Objectives

It was an objective in making this invention to provide a fishing lure which could be manipulated in water to more closely resemble natural bait sources.

SUMMARY OF THE INVENTION

In accordance with the invention, an improved fishing lure is provided which has an elongate cylindrical body member which may be hollow if desired to receive and hold a fish scent capsule through one end thereof for the purpose of exuding stimuli attractive to fish. The opposite end of the body member is pressed or molded together to form a leader section having a planar surface which is disposed at an obtuse angle of from about 135° to about 175° with respect to the longitudinal axis of the cylindrical body. The leader section is adapted to be attached to the leader and line from which the lure is trolled through the water.

An elongate tail section is disposed at the opposite end of the body member. The tail section is generally concave in cross section and has an open upper surface with flared lateral sides having increasing lateral dimension as they extend from the point of attachment to the opposite end of the tail section. A fish hook may be attached to the tail section by appropriate means, such as through an aperture near the outer end of the section.

The upper open surface of the tail section can be disposed in a rotated position about the longitudinal axis of the body, with the angle of rotation measuring up to about 32° in either the clockwise or counterclockwise direction with respect to the planar surface of the leader section. Such a rotation provides increased twisting and gyrating motion to the lure, without permitting the lure to roll over in the water. The tail section may be disposed at an obtuse angle of from about 135° to about 175° with respect to the longitudinal axis of the tubular body if desired.

THE DRAWING

The best mode presently contemplated of carrying out the invention is illustrated in the accompanying drawing, in which.

DETAILED DESCRIPTION OF THE ILLUSTRATED EMBODIMENT

Figure 1:
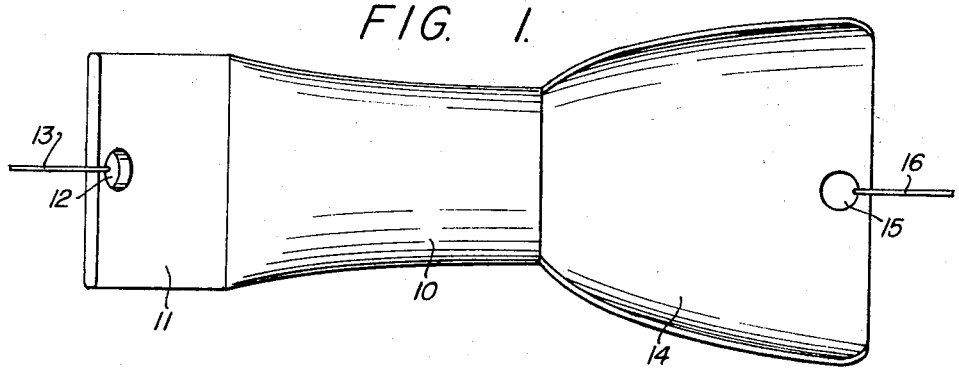
FIG. 1 is a top plan view of a preferred embodiment of the lure.

As shown in FIG. 1, a specific embodiment of the invention has a hollow, cylindrical, tube-like body member 10 of sheet metal construction adapted to receive and hold fish scent material (not shown), if desired, to enhance the attractiveness of the lure to the fish. One end of body member 10 is pressed or molded together forming a leader section 11 having a planar surface which forms an obtuse angle of from about 135° to about 175° with the longitudinal axis of the tubular body 10. The angle shown in FIG. 2 approximates 135°. Leader section 11 provides means for attaching leader 13 and line thereto. Although the preferred method for forming the leader section 11 is to flatten or press the end of tube member 10 together, it is obvious that other methods can be employed to attach a flat, rectangular member to the closed end of body member 10 to form the leader section as disclosed herein.

At the opposite, open end of tubular member 10 an elongate, flared tail section 14 is disposed. Tail section 14 is generally concave in cross-section with an open upper surface, as illustrated more closely in FIGS. 4 and 6, and has the sides thereof flared outwardly in increasing lateral dimension as the tail section extends from the point of attachment with the body member. Tail section 14 has an aperture 15 near its outer end through which a hook 16 or other means of securing a fish to the lure is attached. Tail section 14 can be of unitary construction with body member 10 and leader section 11, if desired. This can be accomplished by cutting an elongate segment out of the circumference of a tube corresponding to approximately a 120° arc. The segment should correspond in length to the desired length of the elongate tail section. The sides of the tube adjacent the cut-away portion can then be flared outwardly to conform to the construction of tail section 14. In so outwardly flaring the tail section sides, the elongate tail section can be raised to form an obtuse angle of from about 135° to about 175° with the longitudinal axis of the body member. The concave cross-sectional dimension of tail section 14 provides easy access to the open end of hollow body member 10, which permits convenient placement of scent material into the body member.

Figure 2:
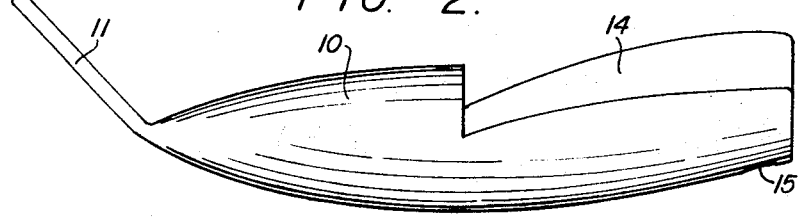
FIG. 2 is a side elevation of a preferred lure in which the tail section is rotated counterclockwise about the tubular body.
Figure 3:
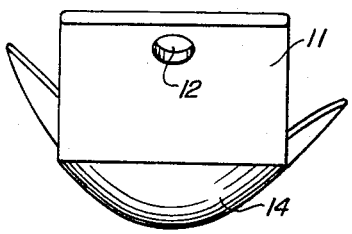
FIG. 3 is an end elevation of the lure showing the counterclockwise rotation of the tail section with respect to the leader section.
Figure 4:
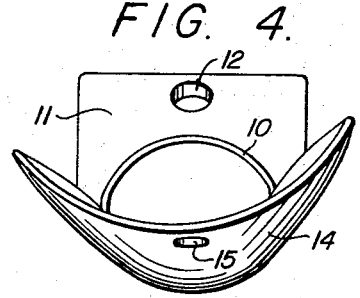
FIG. 4 is an end elevation of the opposite end of the lure from the view in FIG. 3, showing the counterclockwise rotation of the tail section.
Figure 5:
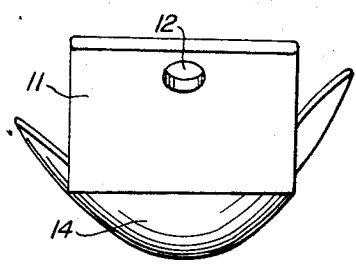
FIG. 5 is an end elevation of another preferred embodiment showing the tail section rotated in a clockwise direction.
Figure 6:
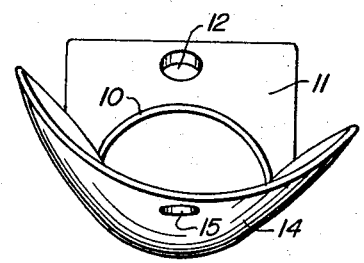
FIG. 6 shows an end elevation of the embodiment shown in FIG. 5 from the end of the tail section.

Tail section 14 can be rotated either counterclockwise (as shown in FIGS. 2–4) or clockwise (as shown in FIGS. 5 and 6) in relation to body member 10 and the planar surface of leader section 11. When the open, upper portion of the tail section is in line with the flat surface of leader section 11, the angle of rotation of tail section 14 can be said to be 0°. In the preferred embodiment illustrated in the attached drawing, the open, upper portion of tail section 14 is rotated from about 5° to about 32° in either clockwise or counterclockwise direction about the longitudinal axis of the body member. The purpose for this rotational disposition is to provide additional and more pronounced gyrations in the lure than would otherwise be possible. Over about 32° rotation, however, the lure is susceptible of completely rolling over or rotating on the longitudinal axis, which is undesireable for this type lure. Hence, the maximum angle of about 32° is important to provide maximum gyration, but prevent roll-over of the lure.

While the illustrated embodiments have been described with the leader section 11 as the static reference point for determining the rotational angle of tail section 14, it is also apparent that the tail section can be employed as a static reference point for determining similar angles of rotation for the leader section. Regardless of the reference point, the rotational relationship between the planar surface of the leader section and the elongate open area of the tail section can vary between 5° and about 32°. Angles less than 5° generally do not provide sufficient gyration to be effective.

Construction materials for the lure can vary according to economics, ease of construction and personal preference. Sheet metal tubing has been found to be economical and easily workable for unitary construction of the complete lure. Similarly, copper, brass, chromium and the like can also be employed. Dense wood and weighted plastic can be utilized, if care is taken to provide sufficient weight, such as the use of lead sinkers on the leader, to prevent the lure from floating at the surface of the body of water. As will be obvious to those skilled in the art, the lures can be cast, molded, machined or carved, depending on the type of construction materials used. In one embodiment of the lure is covered with real or imitation fur with a tail to resemble a small mouse. This does not adversely affect the motion characteristics of the lure.

The lures can be of virtually any size, since the length and circumference of the lure will depend on the size and type of fish to be caught and the type of natural bait to be imitated by the lure. The type of natural bait to be imitated will also have a bearing on the coloration of the lure, although successful lures have been produced in accordance with the invention by employing varying colors and even bright chromium and natural metal or wood finish, or any combination thereof.

A number of variations can be utilized in the construction of the lures and still come within the concept of the invention. For example, the edges of the flared sides of the tail section can be tapered toward the rear of the section, or can be beveled or rounded at the rear corners. If a scent capsule or other fish bait material is not desired for use with the lure, the body member can be left empty or can be sealed.

Whereas this invention is illustrated and described herein with respect to certain preferred forms, it is to be understood that many variations are possible without departing from the inventive concepts particularly pointed out in the claims.

I claim:

1. A fishing lure, comprising in combination:
   an elongate, cylindrical body member having one end thereof pressed together forming a leader section having a planar surface disposed at an obtuse angle of from about 135° to about 175° with respect to the longitudinal axis of the body member; and
   an elongate tail section disposed at the opposite end of the body member, at a rotational angle of between about 5° and about 32° around the longitudinal axis of the body member, said tail section being of generally concave cross-section with flared sides, said flared sides having increasing lateral dimension from the point of attachment to the opposite end of the tail section.

2. A fishing lure as set forth in claim 1, wherein the cylindrical body member is hollow.

3. A fishing lure as set forth in claim 1, wherein the leader section has an aperture for attaching a leader thereto.

4. A fishing lure as set forth in claim 1, wherein the tail section has an aperture for attaching a leader thereto.

5. A fishing lure as set forth in claim 1, wherein the tail section is disposed at an obtuse angle of from about 175° to about 135° with respect to the longitudinal axis of the body member.

* * * * *